US012803625B2

(12) United States Patent
Vadapalli et al.

(10) Patent No.: US 12,803,625 B2
(45) Date of Patent: Nov. 17, 2026

(54) UPLINK TRANSMISSION IN MULTIPLE CARRIERS IN DUAL UPLINK MODE OF OPERATION

(71) Applicant: QUALCOMM Incorporated, San Diego, CA (US)

(72) Inventors: Syam Pavan Vadapalli, Visakhapatnam (IN); Karan Mahajan, Kapurthala (IN); Ankammarao Ravuvari, Hyderabad (IN); Dinesh Kumar Devineni, San Diego, CA (US); Rasul Mastan Mahammad, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 121 days.

(21) Appl. No.: 18/484,315

(22) Filed: Oct. 10, 2023

(65) Prior Publication Data

US 2025/0119188 A1 Apr. 10, 2025

(51) Int. Cl.

*H04B 7/0456* (2017.01)
*H04W 72/0446* (2023.01)
*H04W 72/1268* (2023.01)

(52) U.S. Cl.

CPC ...... *H04B 7/0479* (2023.05); *H04W 72/0446* (2013.01); *H04W 72/1268* (2013.01)

(58) Field of Classification Search

CPC ............ H04B 7/0479; H04W 72/0446; H04W 72/1268
USPC .......................................................... 375/262
See application file for complete search history.

(56) References Cited

U.S. PATENT DOCUMENTS

2021/0345253 A1* 11/2021 Matsumura .......... H04B 7/0639
2023/0232393 A1 7/2023 Gaal et al.

FOREIGN PATENT DOCUMENTS

WO 2023023921 A1 3/2023
WO WO-2023129674 A2 * 7/2023 ........... H04L 5/0053

OTHER PUBLICATIONS

International Search Report and Written Opinion—PCT/US2024/046134—ISA/EPO—Nov. 29, 2024.

* cited by examiner

*Primary Examiner* — Leila Malek
(74) *Attorney, Agent, or Firm* — HARRITY & HARRITY, LLP

(57) ABSTRACT

Various aspects of the present disclosure generally relate to wireless communication. In some aspects, a user equipment (UE) may receive a first resource grant indicating a first set of resources for a first uplink transmission in a slot, the first resource grant comprising a single input single output (SISO) grant associated with a first carrier of a first frequency band. The UE may receive a second resource grant indicating a second set of resources for a second uplink transmission in the slot, the second resource grant comprising a spatial multiplexed single layer (SMSL) uplink grant associated with a second carrier of a second frequency band. The UE may transmit, using a first transmission chain of the UE, the first uplink transmission. The UE may transmit, using a second transmission chain of the UE, the second uplink transmission. Numerous other aspects are described.

30 Claims, 9 Drawing Sheets

UPLINK TRANSMISSION IN MULTIPLE CARRIERS IN DUAL UPLINK MODE OF OPERATION

FIELD OF THE DISCLOSURE

Aspects of the present disclosure generally relate to wireless communication and to techniques and apparatuses for uplink transmission in multiple carriers in dual uplink mode of operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include one or more memories and one or more processors coupled to the one or more memories. The one or more processors may be configured to receive a first resource grant indicating a first set of resources for a first uplink transmission in a slot, the first resource grant comprising a single input single output (SISO) grant associated with a first carrier of a first frequency band. The one or more processors may be configured to receive a second resource grant indicating a second set of resources for a second uplink transmission in the slot, the second resource grant comprising a spatial multiplexed single layer (SMSL) uplink grant associated with a second carrier of a second frequency band. The one or more processors may be configured to transmit, using a first transmission chain of the UE, the first uplink transmission. The one or more processors may be configured to transmit, using a second transmission chain of the UE, the second uplink transmission.

Some aspects described herein relate to a method of wireless communication performed by a UE. The method may include receiving a first resource grant indicating a first set of resources for a first uplink transmission in a slot, the first resource grant comprising a SISO grant associated with a first carrier of a first frequency band. The method may include receiving a second resource grant indicating a second set of resources for a second uplink transmission in the slot, the second resource grant comprising an SMSL uplink grant associated with a second carrier of a second frequency band. The method may include transmitting, using a first transmission chain of the UE, the first uplink transmission. The method may include transmitting, using a second transmission chain of the UE, the second uplink transmission.

Some aspects described herein relate to a non-transitory computer-readable medium that stores a set of instructions for wireless communication by a UE. The set of instructions, when executed by one or more processors of the UE, may cause the UE to receive a first resource grant indicating a first set of resources for a first uplink transmission in a slot, the first resource grant comprising a SISO grant associated with a first carrier of a first frequency band. The set of instructions, when executed by one or more processors of the UE, may cause the UE to receive a second resource grant indicating a second set of resources for a second uplink transmission in the slot, the second resource grant comprising an SMSL uplink grant associated with a second carrier of a second frequency band. The set of instructions, when executed by one or more processors of the UE, may cause the UE to transmit, using a first transmission chain of the UE, the first uplink transmission. The set of instructions, when executed by one or more processors of the UE, may cause the UE to transmit, using a second transmission chain of the UE, the second uplink transmission.

Some aspects described herein relate to an apparatus for wireless communication. The apparatus may include means for receiving a first resource grant indicating a first set of resources for a first uplink transmission in a slot, the first resource grant comprising a SISO grant associated with a first carrier of a first frequency band. The apparatus may include means for receiving a second resource grant indicating a second set of resources for a second uplink transmission in the slot, the second resource grant comprising an SMSL uplink grant associated with a second carrier of a second frequency band. The apparatus may include means for transmitting, using a first transmission chain of the apparatus, the first uplink transmission. The apparatus may include means for transmitting, using a second transmission chain of the apparatus, the second uplink transmission.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
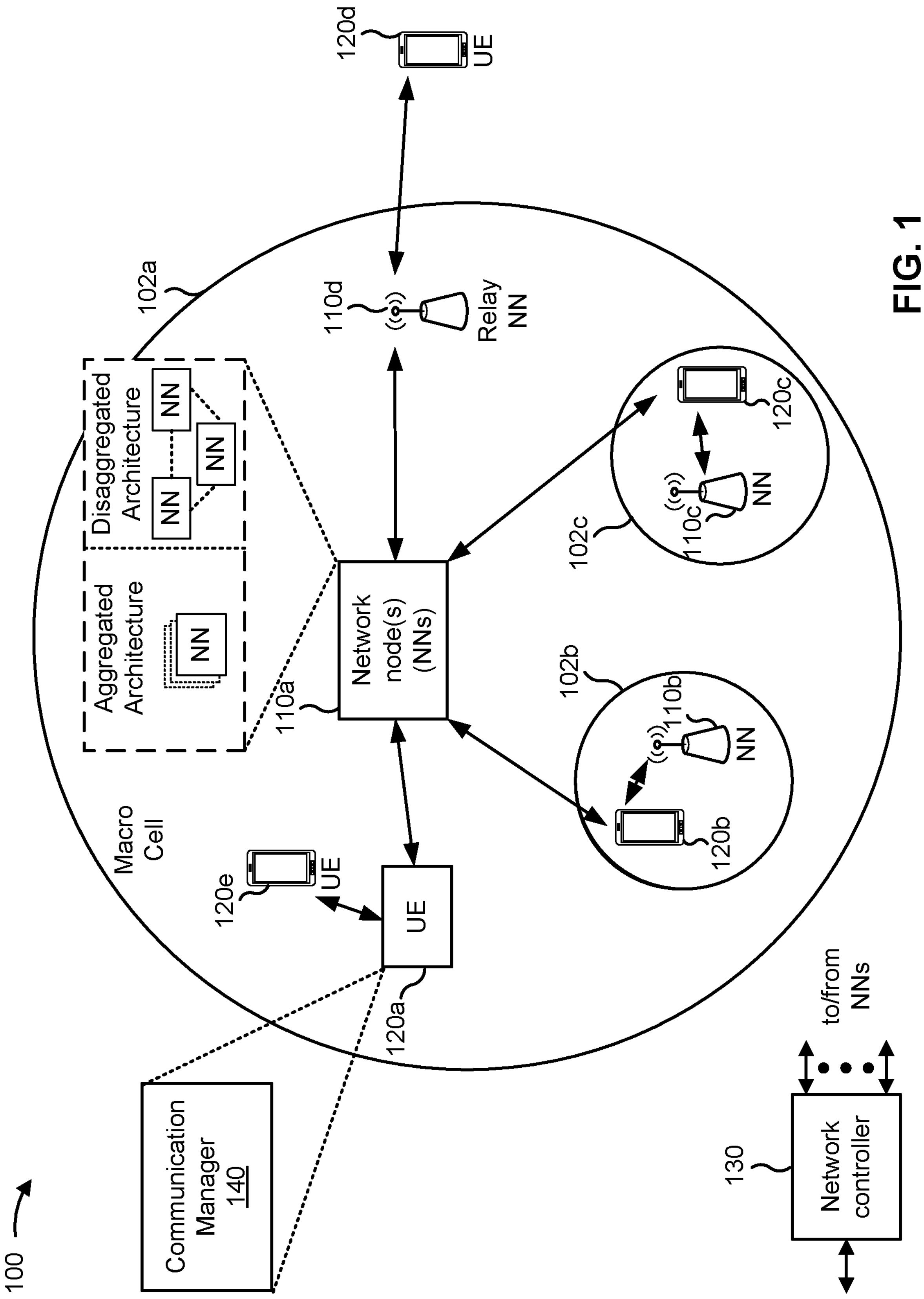
FIG. 1 is a diagram illustrating an example of a wireless network, in accordance with the present disclosure.

A user equipment (UE) may be configured to perform dual uplink (UL) transmissions in inter-band uplink carrier aggregation mode. In some cases, UEs can be equipped with up to two transmission (Tx) chains for uplink transmissions. A UE can operate in an inter-band uplink carrier aggregation mode in which a primary component carrier (PCC) is a frequency division duplex (FDD) carrier and a secondary component carrier (SCC) is a time division duplex (TDD) carrier (which may be denoted "F+T"), or an inter-band uplink carrier aggregation mode in which a PCC is a TDD carrier and an SCC is an FDD carrier (which may be denoted "T+F"). A UE operating in an inter-band uplink carrier aggregation mode (F+T or T+F) can perform simultaneous uplink transmissions, but may be limited to UL single input single output (SISO) per each carrier per band.

When a UE is operating in the dual uplink mode of operation, if the network schedules an FDD SISO UL physical uplink shared channel (PUSCH) transmission and one or more TDD spatial multiplexed single layer (SMSL) PUSCH transmissions (e.g., where a transmit precoding matrix indicator (TPMI) is equal to 0 or 1), the UE may drop either one of the transmissions. The dropping of one of the PUSCH transmissions may lead to unwanted retransmissions triggered by the network and/or uplink throughput loss (at lower layers and/or higher layers).

Some aspects of the techniques described herein may facilitate uplink transmissions in multiple carriers in dual mode of operation without dropping some PUSCH transmissions. For example, in some aspects, a UE may receive a first resource grant indicating a first set of resources for a first uplink transmission in a slot and a second resource grant indicating a second set of resources for a second uplink transmission in the slot. The first resource grant may include a SISO grant associated with a first carrier of a first frequency band and the second resource grant may include an SMSL uplink grant associated with a second carrier of a second frequency band. The UE may transmit, using a first transmission chain of the UE, the first uplink transmission and may transmit, using a second transmission chain of the UE, the second uplink transmission.

For example, in some aspects, when the UE is operating in dual uplink mode and the network configures an FDD UL SISO grant on one carrier of one band and a TDD SMSL uplink grant (TPMI=1) on another carrier on another band, the UE may transmit the TDD SMSL uplink transmission using the available Tx port and the available Tx chain with the TDD carrier. For example, the UE may refrain from transitioning the available transmission chain to a discontinuous transmission (DTX) and may, instead, use the available transmission chain for the SMSL transmission. In this way, some aspects enable a UE to respect (e.g., utilize) the resource grants given by the network and not drop SMSL PUSCH transmissions on the TDD carrier. In some aspects, the network would receive transmissions on both ports and would be able to decode the SMSL PUSCH transmissions. As a result, some aspects may improve uplink throughput at a UE, thereby positively impacting device and/or network performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive a first resource grant indicating a first set of resources for a first uplink transmission in a slot, the first resource grant comprising a SISO grant associated with a first carrier of a first frequency band; receive a second resource grant indicating a second set of resources for a second uplink transmission in the slot, the second resource grant comprising an SMSL uplink grant associated with a second carrier of a second frequency band; transmit, using a first transmission chain of the UE, the first uplink transmission; and transmit, using a second transmission chain of the UE, the second uplink transmission. Additionally, or alternatively, the communication manager 140 may perform one or more other operations described herein.

As indicated above, FIG. 1 is provided as an example. Other examples may differ from what is described with regard to FIG. 1.

Figure 2:
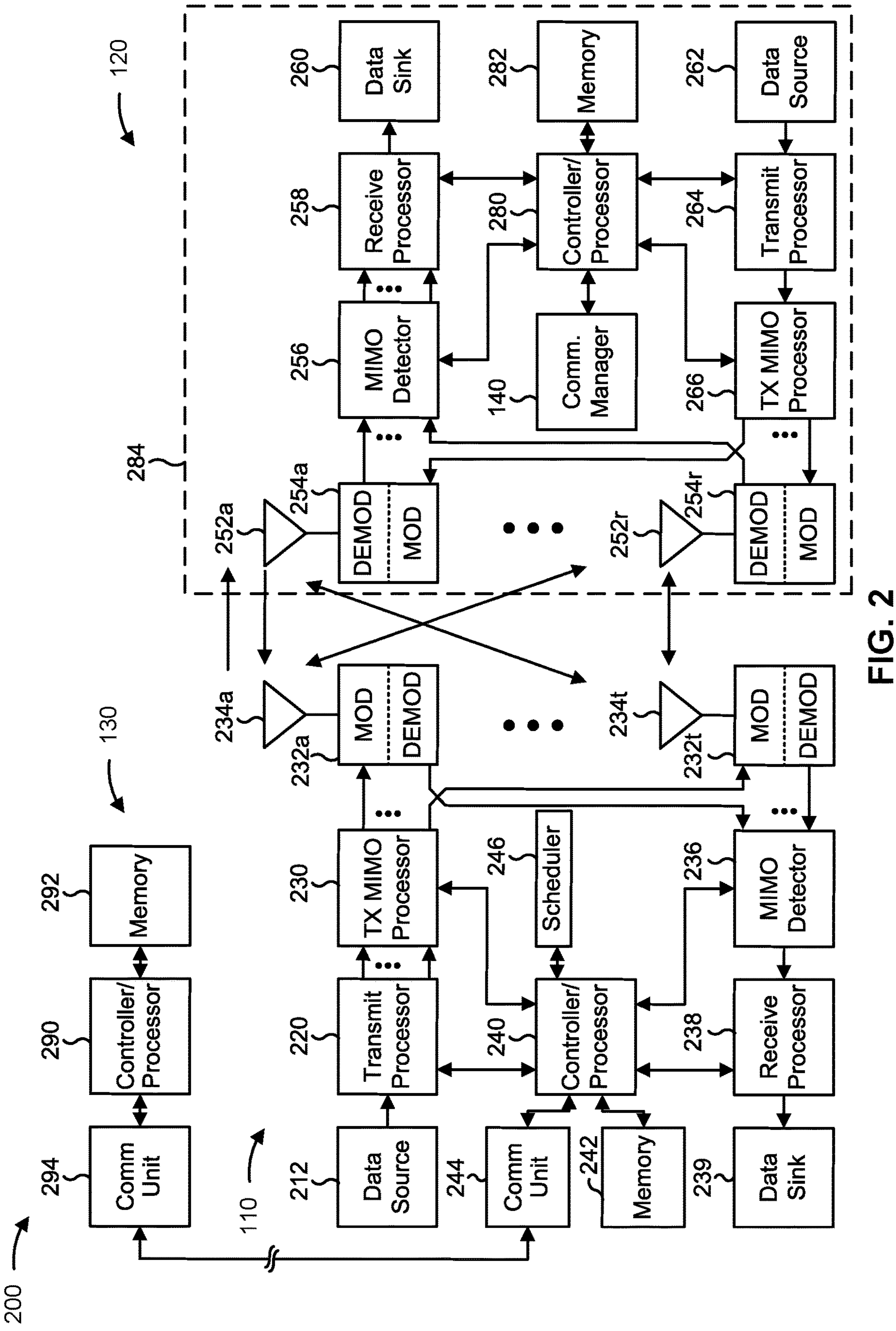
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-9).

The controller/processor 240 of the network node 110, the controller/processor 280 of the UE 120, and/or any other component(s) of FIG. 2 may perform one or more techniques associated with uplink transmission in multiple carriers in dual uplink mode of operation, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8. In some examples, executing instructions may include running the instructions, converting the instructions, compiling the instructions, and/or interpreting the instructions, among other examples.

In some aspects, a UE (e.g., the UE 120) includes means for receiving a first resource grant indicating a first set of resources for a first uplink transmission in a slot, the first resource grant comprising a SISO grant associated with a first carrier of a first frequency band; means for receiving a second resource grant indicating a second set of resources for a second uplink transmission in the slot, the second resource grant comprising an SMSL uplink grant associated with a second carrier of a second frequency band; means for transmitting, using a first transmission chain of the UE, the first uplink transmission; and/or means for transmitting, using a second transmission chain of the UE, the second uplink transmission. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
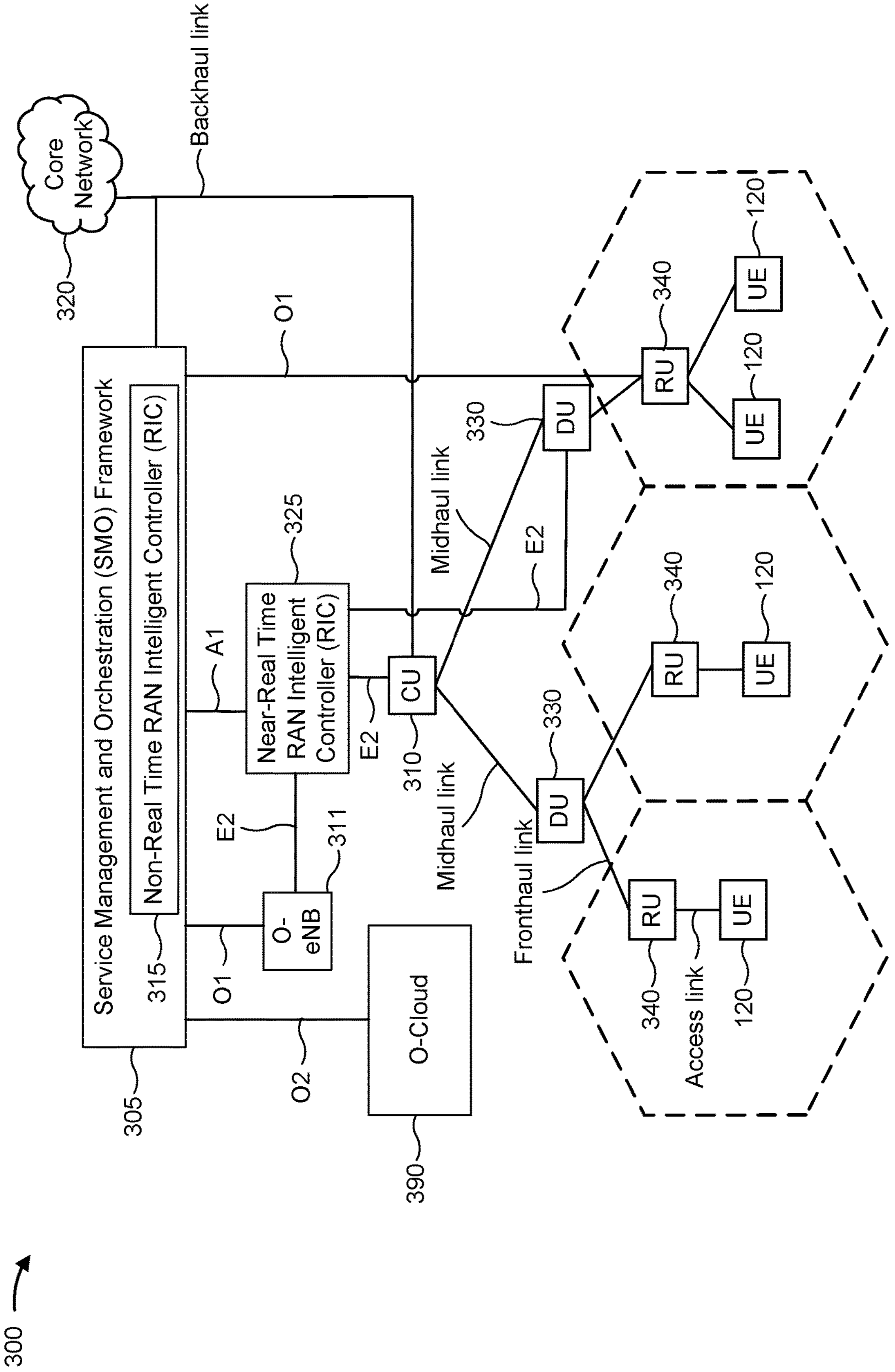
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
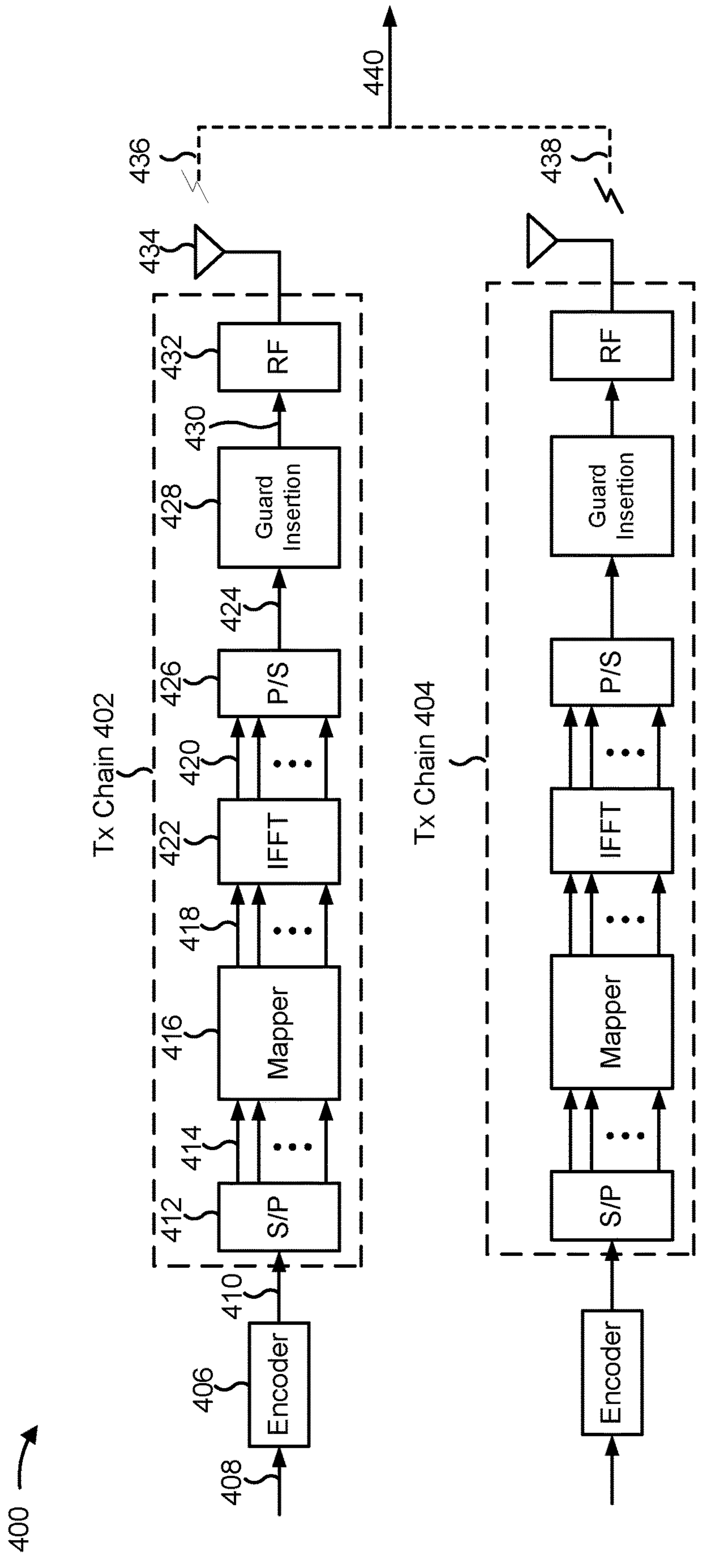
FIG. 4 is a diagram illustrating an example of a transmission (Tx) chain and a transmission chain of a transmitting device (e.g., a UE), in accordance with the present disclosure.

FIG. 4 is a diagram illustrating an example 400 of a transmission (Tx) chain 402 (also called a transmit chain and which may be referred to herein as "Tx0") and a transmission chain 404 (which may be referred to herein as "Tx1") of a transmitting device (e.g., a UE), in accordance with the present disclosure. In some aspects, one or more components of transmission chain 302 and/or transmission chain 304 may be implemented in TX MIMO processor 266, modem 254, and/or controller/processor 280 as described above in connection with FIG. 2. In some aspects, transmission chain 302 and/or transmission chain 304 may be implemented in UE 120 for transmitting data (e.g., uplink data, an uplink reference signal, uplink control information (UCI)) to a receiving device (e.g. a network node 110) on an uplink channel.

An encoder 406 may alter a signal (e.g., a bitstream) 408 into data 410. Data 410 to be transmitted is provided from encoder 406 as input to a serial-to-parallel (S/P) converter 412. In some aspects, S/P converter 412 may split the transmission data 410 into N parallel data streams 414.

The N parallel data streams 414 may then be provided as input to a mapper 416. Mapper 416 may map the N parallel data streams 414 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 416 may output N parallel symbol streams 418, each symbol stream 418 corresponding to one of N orthogonal subcarriers of an inverse fast Fourier transform (IFFT) component. These N parallel symbol streams 418 are represented in the frequency domain and may be converted into N parallel time domain sample streams 420 by an IFFT component 422.

The N parallel time domain sample streams 420 may be converted into an OFDM/OFDMA symbol stream 424 by a parallel-to-serial (P/S) converter 426. A guard insertion component 428 may insert a guard interval between successive OFDM/OFDMA symbols in the OFDM/OFDMA symbol stream. The output 430 of guard insertion component 428 may then be upconverted to a desired transmit frequency band by a radio frequency (RF) front end 432 to generate, using an antenna 434, a signal component 436. The transmission chain 404 may be similar to and/or the same as the transmission chain 402. For example, the transmission chain 404 may include the same components as the transmission chain 402, as shown. Accordingly, the description above in connection with the transmission chain 402 also may apply to the transmission chain 404. The transmission chain 404 may generate a signal component 438 that may be transmitted as a resulting signal 440 transmitted by one or more antennas. The resulting signal 440 may include the signal component 436 and/or the signal component 438.

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally, or alternatively, a set of components (e.g., one or more components) shown in FIG. 4 may perform one or more functions described as being performed by another set of components shown in FIG. 4.

Figure 5:
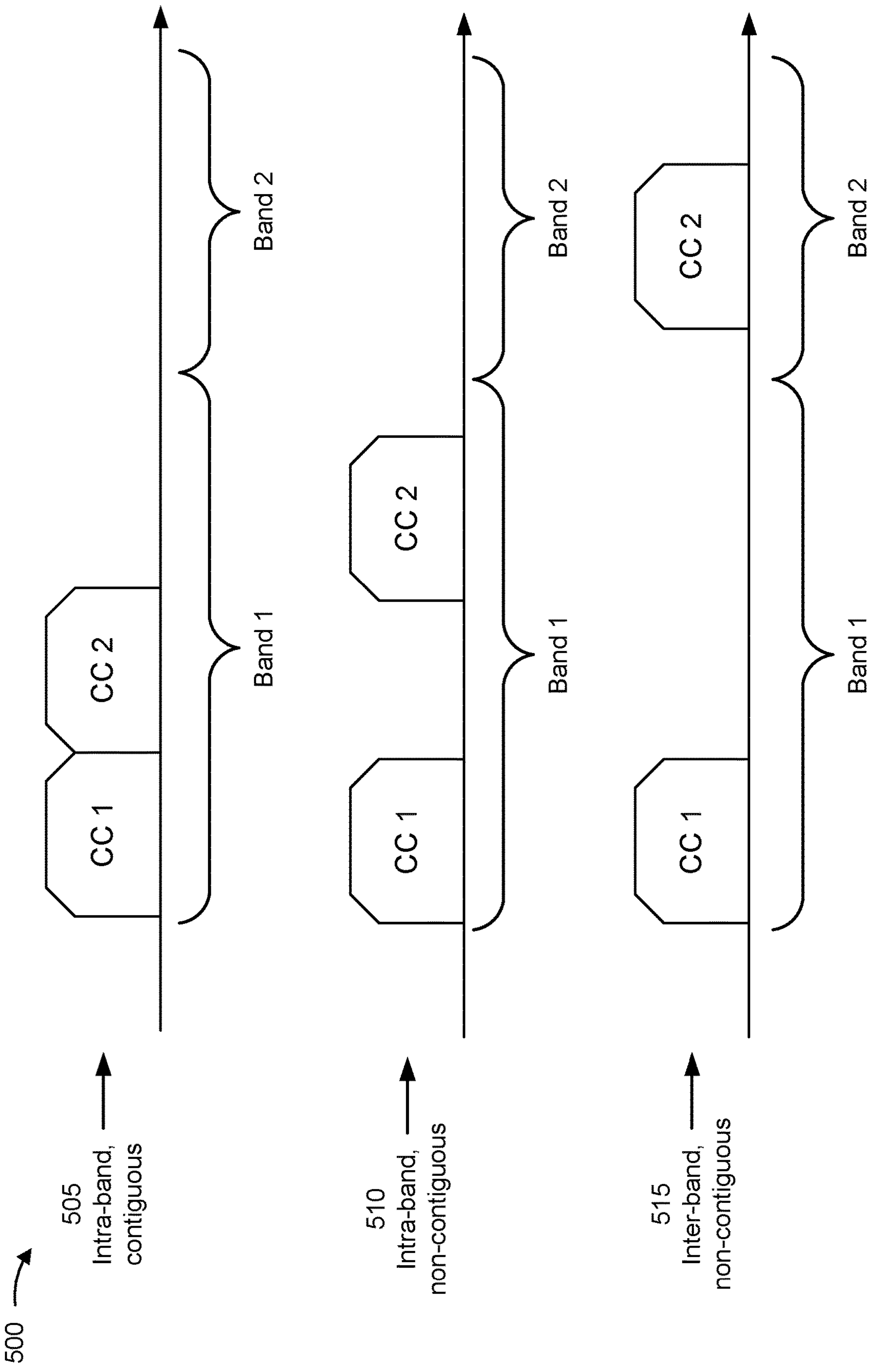
FIG. 5 is a diagram illustrating examples of carrier aggregation, in accordance with the present disclosure.

FIG. 5 is a diagram illustrating examples 500 of carrier aggregation, in accordance with the present disclosure.

Carrier aggregation is a technology that enables two or more component carriers (CCs, sometimes referred to as carriers) to be combined (e.g., into a single channel) for a single UE to enhance data capacity. As shown, carriers can be combined in the same or different frequency bands. Additionally, or alternatively, contiguous or non-contiguous carriers can be combined. A network node may configure carrier aggregation for a UE, such as in a radio resource control (RRC) message, downlink control information (DCI), and/or another signaling message.

As shown by reference number 505, in some aspects, carrier aggregation may be configured in an intra-band contiguous mode where the aggregated carriers are contiguous to one another and are in the same band. As shown by reference number 510, in some aspects, carrier aggregation may be configured in an intra-band non-contiguous mode where the aggregated carriers are non-contiguous to one another and are in the same band. As shown by reference number 515, in some aspects, carrier aggregation may be configured in an inter-band non-contiguous mode where the aggregated carriers are non-contiguous to one another and are in different bands.

In carrier aggregation, a UE may be configured with a primary carrier (which may be referred to as a primary component carrier (PCC) or a primary cell (PCell)) and one or more secondary carriers (which may be referred to as secondary component carriers (SCCs) or secondary cells (SCells)). In some aspects, the PCC may carry control information (e.g., DCI and/or scheduling information) for scheduling data communications on one or more SCCs, which may be referred to as cross-carrier scheduling. In some aspects, a carrier (e.g., a PCC or an SCC) may carry control information for scheduling data communications on the carrier, which may be referred to as self-carrier scheduling or carrier self-scheduling.

As indicated above, FIG. 5 is provided as an example. Other examples may differ from what is described with regard to FIG. 5.

A UE may be configured to perform uplink transmission switching via an uplinkTxSwitchingOption parameter. The UE may be configured, via a radio resource control (RRC) signaling message, with one or both of two available modes associated with the uplinkTxSwitchingOption parameter. The two modes of operation are switch uplink (switchedUL) mode and dual uplink (dualUL) mode. An objective of the uplink switching feature is to enhance the uplink throughput while the UE operates in inter-band uplink carrier aggregation mode. In some cases, uplink (UL) multiple input multiple output (MIMO) is supported in New Radio (NR) time division duplex (TDD) bands and may almost double the UL throughput when the network configures UL grants with 2×2 MIMO.

In some cases, UEs can be equipped with up to two Tx chains for uplink transmissions. A UE can operate in an inter-band uplink carrier aggregation mode in which a primary component carrier (PCC) is a frequency division duplex (FDD) carrier and a secondary component carrier (SCC) is a TDD carrier (which may be denoted "F+T"), or an inter-band uplink carrier aggregation mode in which a PCC is a TDD carrier and an SCC is an FDD carrier (which may be denoted "T+F"). A UE operating in an inter-band uplink carrier aggregation mode (F+T or T+F) can perform simultaneous uplink transmissions, but may be limited to UL single input single output (SISO) per each carrier per band. The uplinkTxSwitchingOption, where the Tx chain(s) can be shared between the carriers, may be used to take advantage of TDD UL MIMO.

When the UE is configured with the switched uplink mode of the uplinkTxSwitchingOption parameter, either an FDD UL SISO transmission or a TDD UL MIMO transmission is possible. When the UE is configured with the dual uplink mode of the uplinkTxSwitchingOption parameter, both an FDD UL SISO transmission and a TDD spatial multiplexed single layer (SMSL) uplink transmission (sometimes referred to as a "TDD UL 1-port transmission") are possible. For example, in dual uplink mode, both of the carriers can perform UL transmissions provided they are 1-port transmissions or TDD UL MIMO transmissions.

Figure 6:
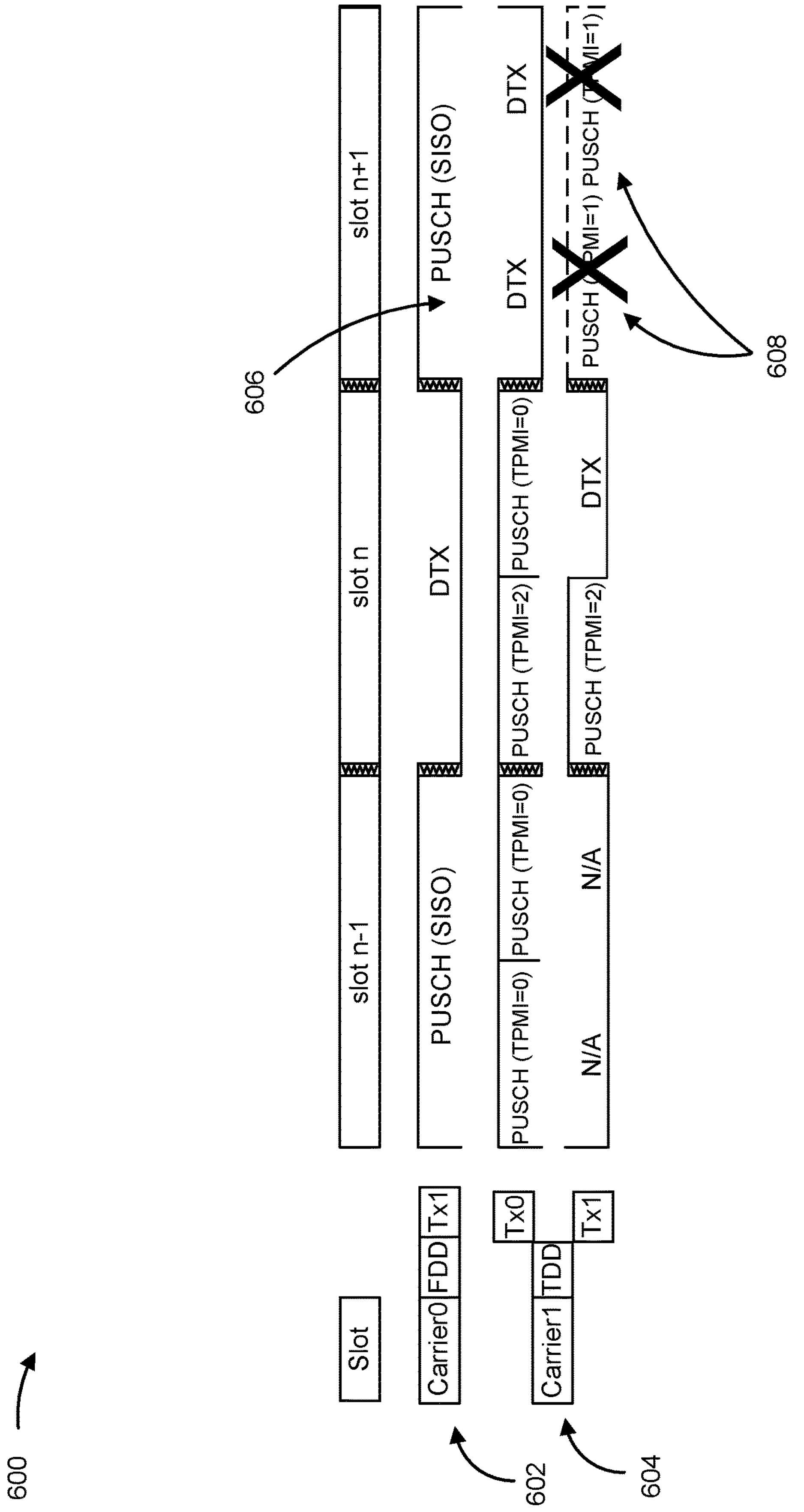
FIG. 6 is a diagram illustrating an example of uplink switching for uplink carrier aggregation, in accordance with the present disclosure.

FIG. 6 is a diagram illustrating an example 600 of uplink switching for uplink carrier aggregation, in accordance with the present disclosure. Example 600 shows slots that are scheduled for a UE on a first carrier 602 ("carrier 0") and a second carrier 604 ("carrier 1") that are aggregated for inter-band carrier aggregation. In some cases, the slots may include slots in frequency division duplex (FDD) in connection with the first carrier 602 and time division duplex (TDD) slots in connection with the second carrier 604. The UE may have two transmission chains, Tx0 and Tx1. The transmission chain Tx0 and/or the transmission Tx1 may be, be similar to, include, or included in the transmission chain 402 and/or the transmission chain 404 depicted in FIG. 4.

Example 600 shows a scenario where simultaneous transmission on two carriers is supported by the UE. For example, the UE may transmit, using Tx1, an uplink communication on carrier 0 in slot n−1 and in slot n+1. The uplink communication may be a physical uplink shared channel (PUSCH) communication transmitted in a single input single output (SISO) resource grant. Because the UE is operating in accordance with a dual uplink mode of operation, the UE may simultaneously transmit one or more uplink communications, using Tx0, on carrier 1. For example, as shown, the one or more uplink communications may include PUSCH communications having a transmit precoding matrix indicator (TPMI) equal to 0.

As shown, the UE may switch the operation of Tx1 from carrier 0 to carrier 1 in slot n. In this case, as shown, the UE may transmit a PUSCH communication having a TPMI equal to 2 and a PUSCH communication having a TPMI equal to 0 using Tx0. Simultaneously with the transmission of the PUSCH communication having the TPMI equal to 0 using Tx0, the UE may transmit, by employing FDD operations, another PUSCH communication having a TPMI equal to 2 using Tx1.

When UE is operating in uplinkTxSwitchingOption, the available Tx chains may be shared by the carriers based on the resource grant. However, in the dual uplink mode of operation, when the network schedules an FDD SISO UL PUSCH transmission 606 and one or more TDD SMSL PUSCH transmissions (e.g., where the transmit precoding matrix indicator is equal to 0 or 1) 608, as shown in connection with slot n+1 depicted in example 600, the UE may drop either one of the transmissions (as indicated by the "Xs" over the PUSCH transmissions associated with Tx1). The dropping of one of the PUSCH transmissions may lead to unwanted retransmissions triggered by the network and/or UL throughput loss (at lower layers and/or higher layers).

Some aspects of the techniques described herein may facilitate uplink transmissions in multiple carriers in dual mode of operation without dropping some PUSCH transmissions. For example, in some aspects, a UE may receive a first resource grant indicating a first set of resources for a first uplink transmission in a slot and a second resource grant indicating a second set of resources for a second uplink transmission in the slot. The first resource grant may include a SISO grant associated with a first carrier of a first frequency band and the second resource grant may include an SMSL uplink grant associated with a second carrier of a second frequency band. The UE may transmit, using a first transmission chain of the UE, the first uplink transmission and may transmit, using a second transmission chain of the UE, the second uplink transmission.

For example, in some aspects, when the UE is operating in dual uplink mode and the network configures an FDD UL SISO grant on one carrier of one band and a TDD SMSL uplink grant (TPMI=1) on another carrier on another band, the UE may transmit the TDD SMSL uplink transmission using the available Tx port and the available Tx chain with the TDD carrier. For example, as shown in FIG. 6, Tx0 may transition to a discontinuous transmission (DTX) for slot n+1 and, in some aspects, the UE may refrain from transitioning Tx0 to DTX and may, instead, use Tx0 for the SMSL transmission. In this way, some aspects enable a UE to respect (e.g., utilize) the resource grants given by the network and not drop SMSL PUSCH transmissions on the TDD carrier. In some aspects, the network would receive transmissions on both ports and would be able to decode the SMSL PUSCH transmissions. As a result, some aspects may improve uplink throughput at a UE, thereby positively impacting device and/or network performance.

As indicated above, FIG. 6 is provided as an example. Other examples may differ from what is described with regard to FIG. 6.

Figure 7:
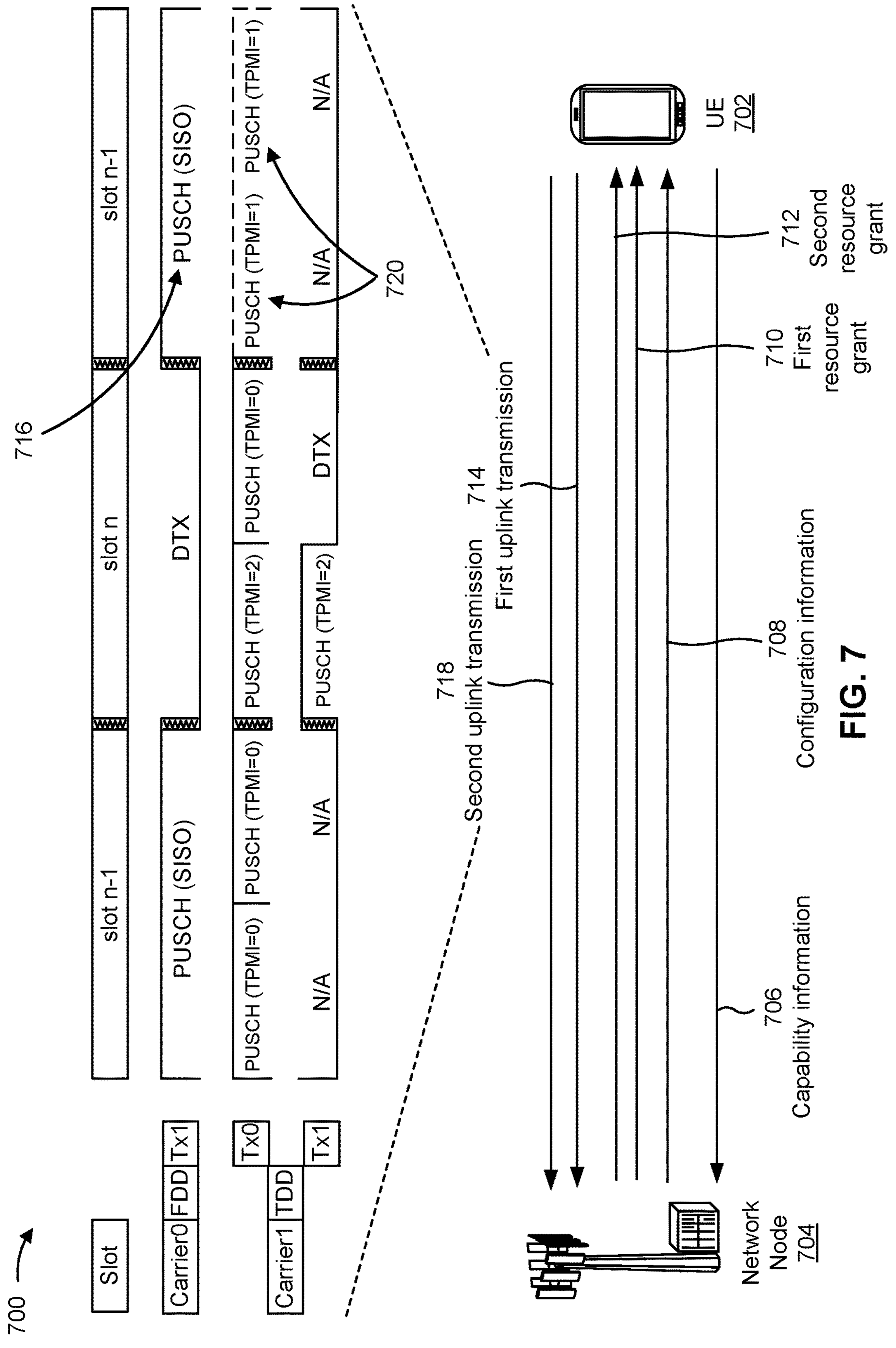
FIG. 7 is a diagram illustrating an example associated with uplink transmission in multiple carriers in dual uplink mode of operation, in accordance with the present disclosure.

FIG. 7 is a diagram illustrating an example 700 associated with uplink transmission in multiple carriers in dual uplink mode of operation, in accordance with the present disclosure. As shown in FIG. 7, a UE 702 and a network node 704 may communicate with one another. In some aspects, the UE 702 may be, be similar to, include, or be included in, the UE 120 depicted in FIGS. 1-3. In some aspects, the network node 704 may be, be similar to, include, or be included in, the network node 110 depicted in FIGS. 1 and 2 and/or one or more components of the disaggregated base station architecture 300 depicted in FIG. 3.

As shown by reference number 706, the UE 702 may transmit, and the network node 704 may receive, capability information. The capability information may include an indication of a UE capability for supporting uplink switching (of carriers in inter-band carrier aggregation) and for supporting dual mode operation. As shown by reference number 708, the network node 704 may transmit, and the UE 702 may receive, configuration information. The configuration information may be indicative of a dual uplink mode of operation for configuration of inter-band carrier aggregation. The configuration information may be used to configure the UE 702 to operate in the dual uplink mode of operation.

As shown by reference number 710, the network node 704 may transmit, and the UE 702 may receive, a first resource grant. The first resource grant may indicate a first set of resources for a first uplink transmission in a slot. In some aspects, the first resource grant may include a SISO grant associated with a first carrier of a first frequency band. As shown by reference number 712, the network node 704 may transmit, and the UE 702 may receive, a second resource grant. The second resource grant may indicate a second set of resources for a second uplink transmission in the slot. In some aspects, the second resource grant may include an SMSL uplink grant associated with a second carrier of a second frequency band. In some aspects, the first and second resource grants may be received in one communication and, in other aspects, the first and second resource grants may be received in separate communications.

In some aspects, the first carrier may include an FDD carrier and the second carrier may include a TDD carrier. In some aspects, the first carrier may include a PCC and the second carrier may include an SCC. In some other aspects, the second carrier may include a PCC and the first carrier may include an SCC. In some aspects, the second resource grant is associated with a TPMI having a value equal to one or zero.

As shown by reference number 714, the UE 702 may transmit, using a first transmission chain (shown as Tx1), the first uplink transmission 716 and, as shown by reference number 718, the UE 702 may transmit, using a second transmission chain (shown as Tx0), the second uplink transmission 720. In some aspects, transmitting the second uplink transmission 720 comprises transmitting the second uplink transmission 720 in association with a dual uplink mode of operation of the UE 702. In some aspects, transmitting the second uplink transmission 720 comprises refraining from transitioning the second transmission chain Tx0 to a DTX. "DTX" may refer to a DTX configuration, a DTX cycle, a DTX sleep period, and/or a DTX mode of operation, among other examples.

As indicated above, FIG. 7 is provided as an example. Other examples may differ from what is described with respect to FIG. 7.

Figure 8:
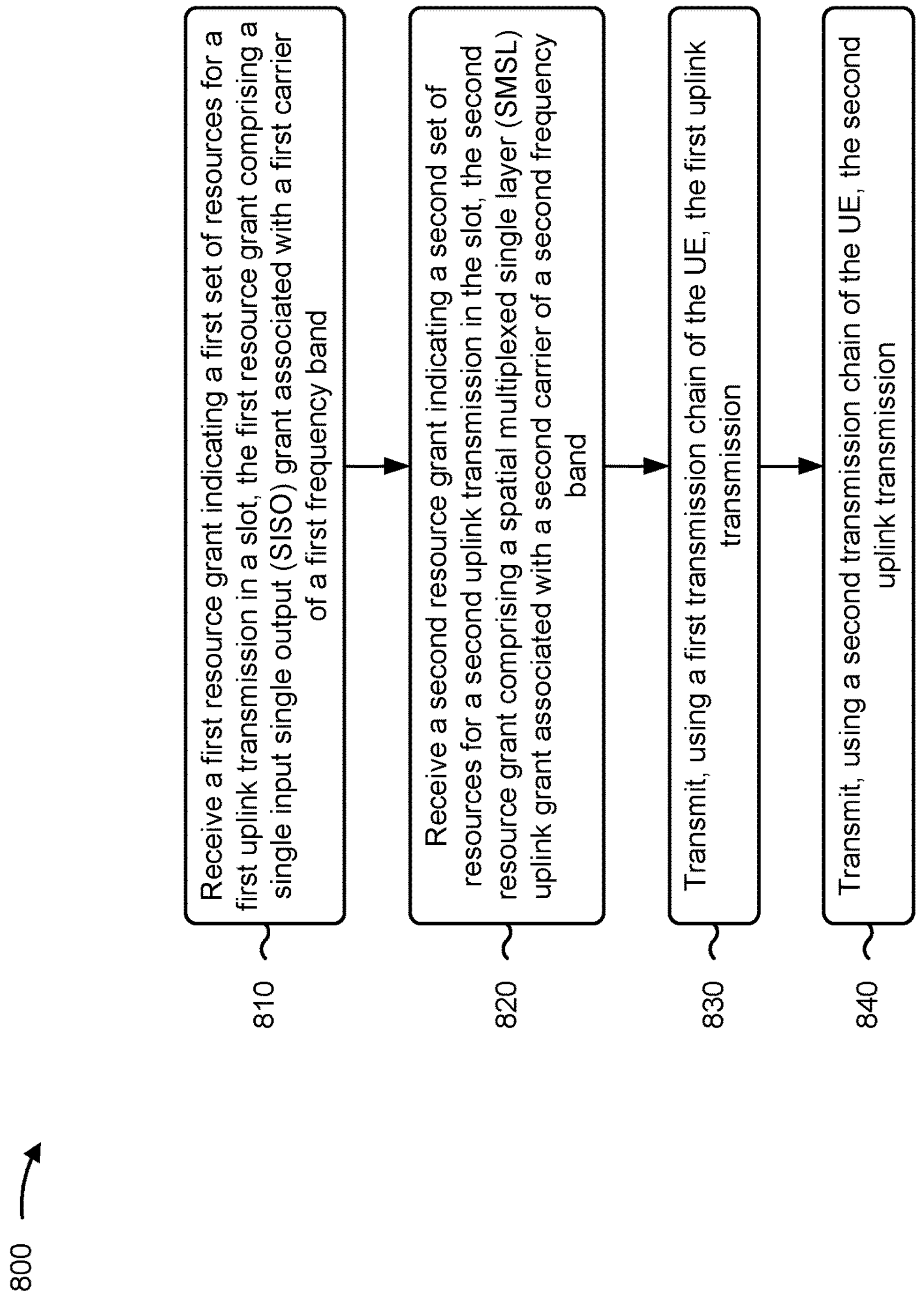
FIG. 8 is a diagram illustrating an example process performed, for example, at a UE or an apparatus of a UE, in accordance with the present disclosure.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with uplink transmission in multiple carriers in dual uplink mode of operation.

As shown in FIG. 8, in some aspects, process 800 may include receiving a first resource grant indicating a first set of resources for a first uplink transmission in a slot, the first resource grant comprising a SISO grant associated with a first carrier of a first frequency band (block 810). For example, the UE (e.g., using reception component 902 and/or communication manager 906, depicted in FIG. 9) may receive a first resource grant indicating a first set of resources for a first uplink transmission in a slot, the first resource grant comprising a SISO grant associated with a first carrier of a first frequency band, as described above.

As further shown in FIG. 8, in some aspects, process 800 may include receiving a second resource grant indicating a second set of resources for a second uplink transmission in the slot, the second resource grant comprising an SMSL uplink grant associated with a second carrier of a second frequency band (block 820). For example, the UE (e.g., using reception component 902 and/or communication manager 906, depicted in FIG. 9) may receive a second resource grant indicating a second set of resources for a second uplink transmission in the slot, the second resource grant comprising an SMSL uplink grant associated with a second carrier of a second frequency band, as described above.

As further shown in FIG. 8, in some aspects, process 800 may include transmitting, using a first transmission chain of the UE, the first uplink transmission (block 830). For example, the UE (e.g., using transmission component 904 and/or communication manager 906, depicted in FIG. 9)

may transmit, using a first transmission chain of the UE, the first uplink transmission, as described above.

As further shown in FIG. 8, in some aspects, process 800 may include transmitting, using a second transmission chain of the UE, the second uplink transmission (block 840). For example, the UE (e.g., using transmission component 904 and/or communication manager 906, depicted in FIG. 9) may transmit, using a second transmission chain of the UE, the second uplink transmission, as described above.

Process 800 may include additional aspects, such as any single aspect or any combination of aspects described below and/or in connection with one or more other processes described elsewhere herein.

In a first aspect, the first carrier comprises an FDD carrier. In a second aspect, alone or in combination with the first aspect, the second carrier comprises a TDD carrier. In a third aspect, alone or in combination with one or more of the first and second aspects, the first carrier comprises a PCC and the second carrier comprises an SCC. In a fourth aspect, alone or in combination with one or more of the first through third aspects, the second carrier comprises a PCC and the first carrier comprises an SCC.

In a fifth aspect, alone or in combination with one or more of the first through fourth aspects, the second resource grant is associated with a TPMI having a value equal to one or zero. In a sixth aspect, alone or in combination with one or more of the first through fifth aspects, transmitting the second uplink transmission comprises transmitting the second uplink transmission in association with a dual uplink mode of operation of the UE. In a seventh aspect, alone or in combination with the sixth aspect, process 800 includes receiving configuration information indicative of the dual uplink mode of operation. In an eighth aspect, alone or in combination with one or more of the first through seventh aspects, transmitting the second uplink transmission comprises refraining from transitioning the second transmission chain to a DTX.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
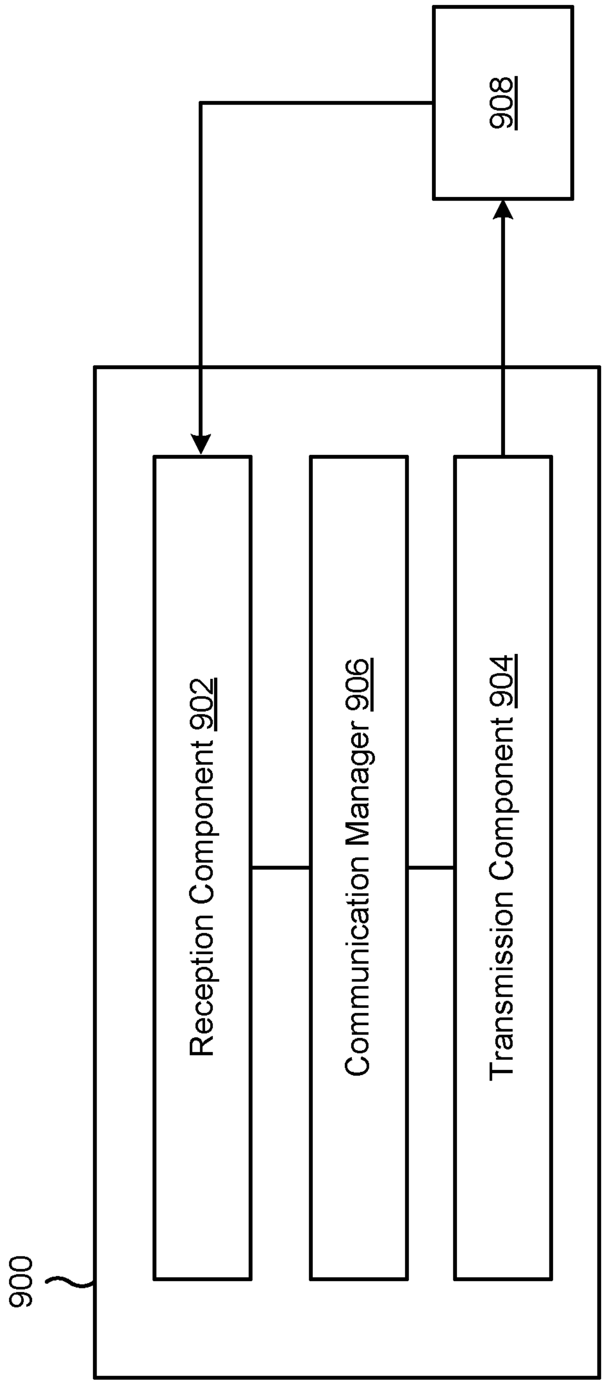
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive a first resource grant indicating a first set of resources for a first uplink transmission in a slot, the first resource grant comprising a SISO grant associated with a first carrier of a first frequency band. The reception component 902 may receive a second resource grant indicating a second set of resources for a second uplink transmission in the slot, the second resource grant comprising an SMSL uplink grant associated with a second carrier of a second frequency band. The transmission component 904 may transmit, using a first transmission chain of the UE, the first uplink transmission. The transmission component 904 may transmit, using a second transmission chain of the UE, the second uplink transmission. The reception component 902 may receive configuration information indicative of the dual uplink mode of operation.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a first resource grant indicating a first set of resources for a first uplink transmission in a slot, the first resource grant comprising a single input single output (SISO) grant associated with a first carrier of a first frequency band; receiving a second resource grant indicating a second set of resources for a second uplink transmission in the slot, the second resource grant comprising a spatial multiplexed single layer (SMSL) uplink grant associated with a second carrier of a second frequency band; transmitting, using a first transmission chain of the UE, the first uplink transmission; and transmitting, using a second transmission chain of the UE, the second uplink transmission.

Aspect 2: The method of Aspect 1, wherein the first carrier comprises a frequency division duplexing (FDD) carrier.

Aspect 3: The method of either of claim 1 or 2, wherein the second carrier comprises a time division duplexing (TDD) carrier.

Aspect 4: The method of any of Aspects 1-3, wherein the first carrier comprises a primary component carrier (PCC) and the second carrier comprises a secondary component carrier (SCC).

Aspect 5: The method of any of Aspects 1-3, wherein the second carrier comprises a primary component carrier (PCC) and the first carrier comprises a secondary component carrier (SCC).

Aspect 6: The method of any of Aspects 1-5, wherein the second resource grant is associated with a transmit precoding matrix indicator having a value equal to one or zero.

Aspect 7: The method of any of Aspects 1-6, wherein transmitting the second uplink transmission comprises transmitting the second uplink transmission in association with a dual uplink mode of operation of the UE.

Aspect 8: The method of Aspect 7, further comprising receiving configuration information indicative of the dual uplink mode of operation.

Aspect 9: The method of any of Aspects 1-8, wherein transmitting the second uplink transmission comprises refraining from transitioning the second transmission chain to a discontinuous transmission.

Aspect 10: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-9.

Aspect 11: An apparatus for wireless communication at a device, the apparatus comprising one or more memories and one or more processors coupled to the one or more memories, the one or more processors configured to cause the device to perform the method of one or more of Aspects 1-9.

Aspect 12: An apparatus for wireless communication, the apparatus comprising at least one means for performing the method of one or more of Aspects 1-9.

Aspect 13: A non-transitory computer-readable medium storing code for wireless communication, the code comprising instructions executable by one or more processors to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

Aspect 15: A device for wireless communication, the device comprising a processing system that includes one or more processors and one or more memories coupled with the one or more processors, the processing system configured to cause the device to perform the method of one or more of Aspects 1-9.

Aspect 16: An apparatus for wireless communication at a device, the apparatus comprising one or more memories and one or more processors coupled to the one or more memories, the one or more processors individually or collectively configured to cause the device to perform the method of one or more of Aspects 1-9.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
- one or more memories; and
- one or more processors, coupled to the one or more memories, configured to cause the UE to:
  - receive a first resource grant indicating a first set of resources for a first uplink transmission in a slot, the first resource grant comprising a single input single output (SISO) grant associated with a first carrier of a first frequency band;
  - receive a second resource grant indicating a second set of resources for a second uplink transmission in the slot, the second resource grant comprising a spatial multiplexed single layer (SMSL) uplink grant associated with a second carrier of a second frequency band;
  - transmit, using a first transmission chain of the UE, the first uplink transmission in the first carrier of the first frequency band; and
  - transmit, using a second transmission chain of the UE, the second uplink transmission in the second carrier of the second frequency band, wherein the one or more processors, to cause the UE to transmit the second uplink transmission, are configured to cause the UE to:
    - use the second transmission chain for the second uplink transmission, instead of using discontinuous transmission, when transmission of the first uplink transmission on the first transmission chain and transmission of the second uplink transmission on the second transmission chain are performed without dropping the first uplink transmission and the second uplink transmission.

2. The UE of claim 1, wherein the first carrier comprises a frequency division duplexing (FDD) carrier.

3. The UE of claim 1, wherein the second carrier comprises a time division duplexing (TDD) carrier.

4. The UE of claim 1, wherein the first carrier comprises a primary component carrier (PCC) and the second carrier comprises a secondary component carrier (SCC).

5. The UE of claim 1, wherein the second carrier comprises a primary component carrier (PCC) and the first carrier comprises a secondary component carrier (SCC).

6. The UE of claim 1, wherein the second resource grant is associated with a transmit precoding matrix indicator having a value equal to one or zero.

7. The UE of claim 1, wherein the one or more processors, to cause the UE to transmit the second uplink transmission, are configured to cause the UE to transmit the second uplink transmission in association with a dual uplink mode of operation of the UE.

8. The UE of claim 7, wherein the one or more processors are further configured to cause the UE to receive configuration information indicative of the dual uplink mode of operation.

9. A method of wireless communication performed by a user equipment (UE), comprising:
- receiving a first resource grant indicating a first set of resources for a first uplink transmission in a slot, the first resource grant comprising a single input single output (SISO) grant associated with a first carrier of a first frequency band;
- receiving a second resource grant indicating a second set of resources for a second uplink transmission in the slot, the second resource grant comprising a spatial multiplexed single layer (SMSL) uplink grant associated with a second carrier of a second frequency band;
- transmitting, using a first transmission chain of the UE, the first uplink transmission in the first carrier of the first frequency band; and
- transmitting, using a second transmission chain of the UE, the second uplink transmission in the second carrier of the second frequency band, wherein transmitting the second uplink transmission comprises:
  - using the second transmission chain for the second uplink transmission, instead of using discontinuous transmission, when transmission of the first uplink transmission on the first transmission chain and transmission of the second uplink transmission on the second transmission chain are performed without dropping the first uplink transmission and the second uplink transmission.

10. The method of claim 9, wherein the first carrier comprises a frequency division duplexing (FDD) carrier.

11. The method of claim 9, wherein the second carrier comprises a time division duplexing (TDD) carrier.

12. The method of claim 9, wherein the first carrier comprises a primary component carrier (PCC) and the second carrier comprises a secondary component carrier (SCC).

13. The method of claim 9, wherein the second carrier comprises a primary component carrier (PCC) and the first carrier comprises a secondary component carrier (SCC).

14. The method of claim 9, wherein the second resource grant is associated with a transmit precoding matrix indicator having a value equal to one or zero.

15. The method of claim 9, wherein transmitting the second uplink transmission comprises transmitting the second uplink transmission in association with a dual uplink mode of operation of the UE.

16. The method of claim 15, further comprising receiving configuration information indicative of the dual uplink mode of operation.

17. A non-transitory computer-readable medium storing a set of instructions for wireless communication, the set of instructions comprising:

one or more instructions that, when executed by one or more processors of a user equipment (UE), cause the UE to:

receive a first resource grant indicating a first set of resources for a first uplink transmission in a slot, the first resource grant comprising a single input single output (SISO) grant associated with a first carrier of a first frequency band;

receive a second resource grant indicating a second set of resources for a second uplink transmission in the slot, the second resource grant comprising a spatial multiplexed single layer (SMSL) uplink grant associated with a second carrier of a second frequency band;

transmit, using a first transmission chain of the UE, the first uplink transmission in the first carrier of the first frequency band; and transmit, using a second transmission chain of the UE, the second uplink transmission in the second carrier of the second frequency band, wherein the one or more instructions, that cause the UE to transmit the second uplink transmission, cause the UE to:

use the second transmission chain for the second uplink transmission, instead of using discontinuous transmission, when transmission of the first uplink transmission on the first transmission chain and transmission of the second uplink transmission on the second transmission chain are performed without dropping the first uplink transmission and the second uplink transmission.

18. The non-transitory computer-readable medium of claim 17, wherein the first carrier comprises a frequency division duplexing (FDD) carrier.

19. The non-transitory computer-readable medium of claim 17, wherein the second carrier comprises a time division duplexing (TDD) carrier.

20. The non-transitory computer-readable medium of claim 17, wherein the first carrier comprises a primary component carrier (PCC) and the second carrier comprises a secondary component carrier (SCC).

21. The non-transitory computer-readable medium of claim 17, wherein the second carrier comprises a primary component carrier (PCC) and the first carrier comprises a secondary component carrier (SCC).

22. The non-transitory computer-readable medium of claim 17, wherein the second resource grant is associated with a transmit precoding matrix indicator having a value equal to one or zero.

23. The non-transitory computer-readable medium of claim 17, wherein the one or more instructions, that cause the UE to transmit the second uplink transmission, cause the UE to transmit the second uplink transmission in association with a dual uplink mode of operation of the UE.

24. The non-transitory computer-readable medium of claim 23, wherein the one or more instructions further cause the UE to receive configuration information indicative of the dual uplink mode of operation.

25. An apparatus for wireless communication, comprising:

means for receiving a first resource grant indicating a first set of resources for a first uplink transmission in a slot, the first resource grant comprising a single input single output (SISO) grant associated with a first carrier of a first frequency band;

means for receiving a second resource grant indicating a second set of resources for a second uplink transmission in the slot, the second resource grant comprising a spatial multiplexed single layer (SMSL) uplink grant associated with a second carrier of a second frequency band;

means for transmitting, using a first transmission chain of the apparatus, the first uplink transmission in the first carrier of the first frequency band; and means for transmitting, using a second transmission chain of the apparatus, the second uplink transmission in the second carrier of the second frequency band, wherein the means for transmitting the second uplink transmission comprise:

means for using the second transmission chain for the second uplink transmission, instead of using discontinuous transmission, when transmission of the first uplink transmission on the first transmission chain and transmission of the second uplink transmission on the second transmission chain are performed without dropping the first uplink transmission and the second uplink transmission.

26. The apparatus of claim 25, wherein the first carrier comprises a frequency division duplexing (FDD) carrier and the second carrier comprises a time division duplexing (TDD) carrier.

27. The apparatus of claim 25, wherein the means for transmitting the second uplink transmission comprises means for transmitting the second uplink transmission in association with a dual uplink mode of operation of the apparatus.

28. The apparatus of claim 25, wherein the first carrier comprises a primary component carrier (PCC) and the second carrier comprises a secondary component carrier (SCC).

29. The apparatus of claim 25, wherein the second carrier comprises a primary component carrier (PCC) and the first carrier comprises a secondary component carrier (SCC).

30. The apparatus of claim 25, wherein the second resource grant is associated with a transmit precoding matrix indicator having a value equal to one or zero.

* * * * *